(12) United States Patent
Polizzotti et al.

(10) Patent No.: US 8,858,802 B2
(45) Date of Patent: Oct. 14, 2014

(54) DEOILING OF SAGD PRODUCE WATER

(75) Inventors: David M. Polizzotti, Yardley, PA (US); Abdul Rafi Khwaja, Lansdale, PA (US)

(73) Assignee: General Electric Company, Schenectady, NY (US)

( * ) Notice: Subject to any disclaimer, the term of this patent is extended or adjusted under 35 U.S.C. 154(b) by 656 days.

(21) Appl. No.: 12/641,542

(22) Filed: Dec. 18, 2009

(65) Prior Publication Data

US 2011/0147316 A1   Jun. 23, 2011

(51) Int. Cl.
| | | |
|---|---|---|
| C02F 1/56 | (2006.01) | |
| C02F 1/24 | (2006.01) | |
| C02F 1/38 | (2006.01) | |
| C02F 1/44 | (2006.01) | |
| C02F 1/52 | (2006.01) | |
| C02F 101/32 | (2006.01) | |
| C02F 103/10 | (2006.01) | |

(52) U.S. Cl.
CPC ........... *C02F 1/5263* (2013.01); *C02F 2101/32* (2013.01); *C02F 1/56* (2013.01); *C02F 2103/10* (2013.01); *C02F 1/441* (2013.01); *C02F 1/38* (2013.01); *C02F 1/24* (2013.01)
USPC ........... 210/727; 210/725; 210/730; 210/708; 210/705

(58) Field of Classification Search
CPC ...... B01D 17/04; B01D 17/047; B01D 21/01; C10G 33/04; C02F 1/52; C02F 1/5263; C02F 1/5272; C02F 1/54; C02F 1/56; C02F 1/66; C02F 9/00; C02F 2001/52; C02F 2101/32; C02F 2103/10
USPC ................. 210/708, 638, 639, 705, 724–730; 166/267
See application file for complete search history.

(56) References Cited

U.S. PATENT DOCUMENTS

| | | | |
|---|---|---|---|
| 3,520,813 A | 7/1970 | Hansen et al. | |
| 4,136,152 A | 1/1979 | Jones et al. | |
| 4,282,103 A | 8/1981 | Fuhr et al. | |
| 4,558,080 A | 12/1985 | Quamme et al. | |
| 4,558,680 A | 12/1985 | Nakazato | |
| 4,770,790 A | 9/1988 | Oberhofer | |
| 5,084,189 A | 1/1992 | Richter | |
| 5,204,452 A * | 4/1993 | Dingilian et al. | 530/420 |
| 5,433,863 A * | 7/1995 | Braden et al. | 210/708 |
| 5,626,718 A | 5/1997 | Philippe et al. | |
| 5,684,109 A | 11/1997 | Chen et al. | |
| 5,830,315 A | 11/1998 | Mitchell et al. | |
| 5,846,436 A | 12/1998 | Chen et al. | |
| 5,851,433 A | 12/1998 | Hart et al. | |
| 5,916,991 A | 6/1999 | Chen et al. | |
| 5,977,287 A | 11/1999 | Mitchell et al. | |
| 6,020,422 A | 2/2000 | Connors et al. | |
| 6,248,231 B1 | 6/2001 | Di Bella et al. | |
| 6,743,421 B2 | 6/2004 | Vasconcellos et al. | |
| 7,033,507 B2 | 4/2006 | Zhuang | |
| 7,077,201 B2 * | 7/2006 | Heins | 166/266 |
| 7,338,608 B2 | 3/2008 | Adams et al. | |
| 7,344,647 B2 | 3/2008 | Stewart | |
| 7,374,690 B2 | 5/2008 | Reddy | |
| 7,611,632 B1 | 11/2009 | Wang et al. | |
| 7,628,919 B2 * | 12/2009 | Shafer et al. | 210/620 |
| 7,722,841 B2 | 5/2010 | Kawawa et al. | |
| 7,943,048 B2 * | 5/2011 | Khwaja et al. | 210/705 |
| 7,998,351 B2 * | 8/2011 | Rai et al. | 210/708 |
| 8,496,829 B2 | 7/2013 | Melnyk et al. | |
| 2003/0222026 A1 | 12/2003 | Carey et al. | |
| 2005/0098504 A1 * | 5/2005 | Manz et al. | 210/721 |
| 2008/0110630 A1 | 5/2008 | Minnich et al. | |
| 2008/0149569 A1 * | 6/2008 | Rai et al. | 210/728 |
| 2008/0237141 A1 | 10/2008 | Kerfoot | |
| 2009/0127205 A1 | 5/2009 | Sikes et al. | |
| 2011/0174695 A1 * | 7/2011 | Goldman | 208/390 |
| 2011/0272362 A1 * | 11/2011 | Sikes et al. | 210/705 |

FOREIGN PATENT DOCUMENTS

| | | |
|---|---|---|
| WO | 2007047481 A2 | 4/2007 |
| WO | WO2007047481 A2 | 4/2007 |
| WO | 2008079652 A1 | 7/2008 |
| WO | WO2008079652 A1 | 7/2008 |
| WO | 2010011867 A1 | 1/2010 |

OTHER PUBLICATIONS

The PCT Search Report and Written Opinion issued in connection with corresponding International Application No. PCT/US2010/060448 on Mar. 31, 2011.
Ozacar M.; et al., "The Use of Tannins from Turkish Acorns (Valonia) in Water Treatment as a Coagulant and Coagulant Aid", Turkish J. Eng. Env. Sci., 2002, pp. 255-263.
A L., Ahmad; et al., "Chitosan: A Natural Biopolymer for the Adsorption of Residue Oil from Oily Wastewater", Adsorption Science & Technology, Blackwell Scientific, Oxford, GB, vol. 22, No. 1, Feb. 1, 2004, pp. 75-88, XP009145974.
Material Safety Data Sheet—GE Water & Process Technologies, Polyfloc CE1629, Feb. 3, 2009, (6 pages).
Rocklin Products, FlocClear™ Chitosan Based Stormwater Biopolymer, (4 pages), www.rocklinproducts.com.
Material Safety Data Sheet—Halosource, StormKlear: Liqui-Floc 2%, Mar. 9, 2007, (6 pages).
Product Specification Sheet—Cascade EcoSolutions, Inc., 1% ChitoVan™, (1 page).
Technical Data Sheet 213, Polysciences, Inc., N,N-Dimethylaminoethyl methacrylate, (1 page).
Material Safety Data Sheet—Tramfloc, Inc., Tramfloc® 876, Jun. 1, 2003, (5 pages).

(Continued)

Primary Examiner — David C Mellon
(74) Attorney, Agent, or Firm — Wegman, Hessler & Vanderburg

(57) ABSTRACT

Methods of deoiling oily water such as SAGD and frac produce water. The oily water is treated with a natural coagulant selected from tannins and chitosan. A cationic and/or anionic flocculant may also be added to the treated oily water. The thus treated oily water may be subjected to conventional mechanical oil separation techniques such as hydrocyclonic separation, dissolved air flotation, entrapped air flotation, induced gas flotation, gravity filters, reverse osmosis filters, API, or Voraxial® bulk separators and the like.

13 Claims, No Drawings

(56) References Cited

OTHER PUBLICATIONS

Material Safety Data Sheet—GE Water & Process Technologies, Klaraid PC2701, Jul. 20, 2009, (6 pages).
Material Safety Data Sheet—GE Water & Process Technologies, Klaraid PC2700, Jun. 9, 2009, (6 pages).
Material Safety Data Sheet—GE Betz, Inc., Coagulant 250, Feb. 27, 2007, (7 pages).
Material Safety Data Sheet, GE Betz, Inc. Klaraid PC2705, Jun. 7, 2005, (5 pages).
Material Safety Data Sheet, GE Water & Process Technologies, Polyfloc AE1125, Nov. 18, 2009, (7 pages).
Pizzi, A., "Condensed Tannins for Adhesives", Ind. Eng. Chem,., Prod. Res. Dev., 21, pp. 359-369, 1982.
Fabris, R., et al., Pretreatments to Reduce Fouling of Low Pressure MicroFiltration (MF) Membranes, Journal of Membrane Science, vol. 289, Issues 1-2, pp. 231-240, Feb. 15, 2007.
Li, S. et al., "Impact of Backwash Water Composition on Ultrafiltration Fouling Control", Journal of Membrane Science, vol. 344, Issues 1-2, pp. 17-25, Nov. 15, 2009.
Chinese Office Action issued in CN Application No. 201080064235.7 on Aug. 27, 2013.

* cited by examiner

DEOILING OF SAGD PRODUCE WATER

FIELD OF INVENTION

The present invention relates to methods of deoiling oily water including process waters obtained from oil sands mining and other oil and gas recovery operations. More particularly, the invention relates to processes in which a benign natural coagulant made from natural products is employed to clarify the oily wastewater.

BACKGROUND OF THE INVENTION

Steam assisted gravity drainage (SAGD) methods are commonly employed as an enhanced oil recovery technique for producing heavy crude oil and bitumen, especially in the oil sands projects. In this method, two parallel horizontal wells are drilled. The upper well injects steam into the geological formation, and the lower well collects the heated crude oil or bitumen that flows out of the formation along with water from the condensation of the injected steam. This condensed steam and oil are pumped to the surface wherein the oil is separated, leaving an oily/water mixture known as "produce water". Roughly three barrels of this oily and bituminous containing process water are produced per barrel of recovered oil. Recovery and reuse of the water are needed to reduce operational costs and to minimize environmental concerns. The process water is eventually recycled to the steam generators used in the SAGD process, but it must first be clarified and separated from substantial amounts of suspended and emulsified oil, bitumen and other impurities like salts, silica, etc.

The SAGD produce water normally contains about 1-60% solids and has a temperature of about 95° C. It has accordingly been difficult to provide for effective clarification of this SAGD produced water.

Additionally, hydraulic fracturing or fracing may be used to initiate natural gas production in low permeability reservoirs and to restimulate production in older wells. These processes produce millions of gallons of so-called frac water. Once the fracturing is complete, the frac water is contaminated with petroleum residue and is returned to holding tanks for decontamination. Light non-aqueous phase liquids may be separated from the frac water via separation leaving an underlying contaminated frac water containing oily residue that must be separated prior to discharge of the water in an environmentally acceptable manner.

BRIEF DESCRIPTION OF THE INVENTION

In one aspect, the present methods are directed toward the treatment of oily water comprising adding to the oily water an effective amount of a natural coagulant selected from the group consisting of tannins and chitosan. Additionally, a cationic or anionic flocculant can also be added.

Based upon presently available data, the treatment may be applied to steam assisted gravity drainage operation produce water and frac water from hydraulic centrifugal force fracturing operations. In another embodiment, the so-treated oily water is separated in a mechanical separation process such as in flotation, filtration, reverse osmosis, cyclonic, gravity separation, and centrifugal force separation devices such as the "Voraxial®" separation devices available from Enviro Voraxial Technology, Fort Lauderdale, Fla.

The pH of the oily water may be optionally adjusted to a range of about 2 to 8, and in one aspect of the invention, the natural coagulant is then added to the oily water. In another embodiment, the pH of the oily wastewater is adjusted to between about 6.5 to 10 subsequent to the addition of the natural coagulant to the oily wastewater. Further, in another exemplary aspect of the invention, a cationic flocculant and/or anionic flocculant is added to the oily wastewater subsequent to the step of pH adjustment of the wastewater to about 6.5 to 10.0.

DETAILED DESCRIPTION OF THE INVENTION

In one embodiment of the invention, environmentally benign coagulants made from natural products such as tannins and chitosan, etc., are used to treat oil containing produce waters from tar sand SAGD operations as well as produce waters and frac waters from other oil and gas producing operations. In another embodiment, the natural product coagulants may be conjointly employed with cationic and/or anionic flocculants to treat the oily water. The environmentally benign coagulant can be used with or without pH adjustment.

In another exemplary embodiment, the treatment program can be applied conjointly with conventional mechanical oil and water separating unit processes such as hydrocyclonic separators, dissolved air flotation units (DAF), entrapped air flotation units (EAF), induced gas flotation units (IGF), gravity filters, API separators, and centrifugal force separators, such as the Voraxial® brand separators.

In one aspect of the invention, the oil containing produce water is adjusted to a pH of between about 2 to 8. Then, a tannin or chitosan based coagulant is added to the water in a dosage range of from about 0.5 to about 1,000 ppm. The water is then allowed to react for about 15 to 90 seconds. The pH of the water is then adjusted to between about 6.5 to 10. After this pH adjustment, in another embodiment, a cationic flocculant is added in a dosage range of 0.5 to 100 ppm. The cationic flocculant is allowed to react for 2 to 40 seconds. Subsequent to the addition of the cationic flocculant, in another exemplary embodiment, an anionic flocculant is added in a dosage range of 0.5 to 100 ppm. The anionic flocculant is allowed to react for 0 to 30 seconds, and the water phase is allowed to separate from the oil phase. In still other embodiments, the so-treated oily wastewater is fed to mechanical separation units as referred to above to separate the oil and water phases.

In another exemplary embodiment, the coagulants and flocculants as described above are used, but no pH adjustment is made to the water. In another embodiment, the coagulants and flocculants as described above are used, but pH adjustment is only done in one of the steps, either the step before addition of the tannin or chitosan based coagulant or after addition of the coagulant.

As to exemplary tannins that may be employed as one of the benign natural product coagulants, these may be obtained from various wood and vegetation materials found throughout the world. Tannins are a large group of water-soluble complex organic compounds that naturally occur in leaves, twigs, barks, wood, and fruit of many plants and are generally obtained by extraction from plant matter. The composition and structure of tannins will vary depending on the source and method of extraction, but the generic empirical formula is represented by $C_{76}H_{52}O_{46}$. Examples of barks from which tannins can be derived are wattle, mangrove, oak, eucalyptus, hemlock, pine, larch, and willow. Examples of woods are the quebracho, chestnut, oak, mimosa, and urunday. Examples of fruits are myrobalans, valonia, divi-diva, tara, and algarrobilla. Examples of leaves are sumac and gambier. Examples of roots are canaigre and palmetto.

In one aspect of the invention, a water soluble or dispersible tannin containing polymer composition comprising a copolymer of a tannin and a cationic monomer is employed. In another embodiment of the present invention, the water soluble or dispersible tannin containing polymer composition comprises a polymer of tannin; a cationic monomer and an optional monomer selected from the group consisting of an anionic monomer and a nonionic monomer. These tannin polymers are described in U.S. Pat. No. 5,916,991.

As stated in the '991 U.S. patent, the cationic monomer is selected from a group containing ethylenically unsaturated quaternary ammonium, phosphonium or sulfonium ions. Typical cationic monomers are quaternary ammonium salts of dialkylaminoalkyl(meth) acrylamides, dialkylaminoalkyl (meth)acrylates and diallyldialkyl ammonium chloride.

Exemplary cationic monomers include methyl chloride quaternary salt of diethylaminoethyl acrylate, dimethyl sulfate salt of diethylaminoethyl acrylate, dimethylaminoethyl acrylate (AETAC), dimethylaminoethyl methacrylate (MADAME), diethylaminoethyl methacrylate (METAC), dimethylaminopropyl methacrylamide, dimethylaminopropyl acrylamide, diallyldimethyl ammonium chloride and diallyldiethyl ammonium chloride.

The anionic monomer, when present, is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2 methyl propane sulfonic acid (AMPS®) and 3-allyloxy-2hydroxypropane sulfonic acids and salts thereof.

The nonionic monomer, when present, is selected from the group of ethylenically unsaturated nonionic monomers which comprise but are not limited to acrylamide, methacrylamide, N-methylolacrylamide, N,N-dimethyl-acrylamide; lower alkyl ($C_1$-$C_6$) esters including vinyl acetate, methyl acrylate, ethyl acrylate, and methyl methacrylate; hydroxylated lower alkyl ($C_1$-$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. The preferred nonionic monomers are allyl glycidyl ether and acrylamide.

The resulting tannin containing polymer contains from 10 to 80% by weight of tannin, 20 to 90% by weight of cationic monomer, 0 to 30% by weight of nonionic monomer and 0 to 20% by weight of anionic monomer, provided that the resulting tannin containing polymer is still water soluble or dispersible, and the total weight percent of cationic, nonionic and anionic monomers and tannin adds up to 100%. Preferably, when the cationic monomer and anionic monomer are present together in the tannin containing polymer, the cationic monomer comprises a greater weight percentage than the anionic monomer.

Exemplary cationic tannin copolymers include copolymers of tannin and cationic monomer wherein the copolymer contains from 50 to 90 wt % cationic monomer in the copolymer, provided the total weight of tannin and cationic monomers totals 100 wt %. These particular copolymers are most preferred when the tannin is a Mimosa type tannin and the cationic monomer is methyl chloride quaternary salt of dimethylaminoethyl acrylate (AETAC).

The number average molecular weight of the resulting tannin containing polymer is not critical as long as it is still water soluble or water dispersible. The tannin containing polymers may be prepared by mixing the desired monomers with tannin and initiating the polymerization by a free radical initiator via solution, precipitation, or emulsion polymerization techniques. Conventional initiators such as azo compounds, persulfates, peroxides, and redox couples may be used. One exemplary initiator is 2,2' azobis(2-amidinopropane) dihydrochloride and t-butylhydroperoxide/sodium metabisulfite (t-BHP/NaMBS). These or other initiators may be added at the end of polymerization to further react with any residual monomers.

Chain transfer agents such as alcohol, amine, formic acid, or mercapto compounds may be used to regulate the molecular weight of the polymer. The resulting polymer may be isolated by well known techniques including precipitation, etc., or the polymer may simply be used in its aqueous solution.

The reaction temperature is not critical and generally occurs between 20° C. and 100° C., preferably 40° C. to 70° C. The pH of the reaction mixture is also not critical and is generally in the range of 2.0 to 8.0. The resulting tannin containing polymers are characterized by C-13 NMR, Brookfield viscosity and percent solids.

Noteworthy tannin copolymers are graft copolymers of AETAC and mimosa tannin wherein the AETAC monomeric repeat unit in the copolymer is present in an amount of by weight of greater than 50%. Such copolymers are available from GE under the Klaraid PC2704, PC2705, and PC2706 trademarks and have cationic charge densities of 50%, 57.5%, and 70% (by weight) respectively. These copolymers range in MW from about 50,000-70,000 Daltons.

Another particularly noteworthy tannin is a tannin based polymeric coagulant which is comprised of N,N-(dimethylaminoethyl)methacrylate (MADAME) polymerized using t-butylhydroperoxide and sodium metabisulfite. The resulting polyMADAME is converted to hydrochloride and then blended/reacted in an aqueous medium with tannin to obtain a homogenous poly(MADAME)-tannin composition. The mole ratio of tannin/MADAME is about 1:0.5 to 1:50, with a preferred mole ratio of 1:1.5 to about 1:3. Molecular weight is from about 500 to about 2,000,000, preferably 5,000-200,000. One such tannin is sold by GE under the trademark "Coag 250".

Another exemplary tannin is comprised of monomer [2-(methacryloyloxy)ethyl]triammonium chloride (METAC) polymerized using t-butylhydroperoxide and sodium metabisulfite. The resulting polyMETAC is then blended/reacted in an aqueous medium to obtain a homogenous poly (METAC)-tannin composition. The mole ratio of tannin/METAC is from about 1:0.5 to about 1:5.0 with a preferred mole ratio of 1:1.5 to about 1:3. Molecular weight of the polyMETAC is from about 500 to about 2,000,000 with a preferred molecular weight of about 5,000 to about 200,000.

Other exemplary tannin coagulants are those made via reaction of tannin, an amine, and an aldehyde such as those set forth in U.S. Pat. No. 4,558,080. In accordance with the '080 patent, these components are reacted at an acidic pH and where the molar ratio of amine, such as a primary amine, to tannin present is from about 1.5:1-3.0:1. Exemplary tannin/amine compounds include tannin/melamine/formaldehyde polymers such as those sold by Tramfloc Inc. under the Tramfloc 876 designation, tannin/monoethanolamine/formaldehyde polymers as sold by GE under the designation Klaraid PC2700.

In yet another exemplary embodiment, the natural product coagulant may be a chitosan derivative. Chitosan is a non-toxic, biodegradable polymer. Chitosan is derived from chitin, which is a naturally-occurring polymer of beta-1,4-(2-deoxy-2-acetamidoglucose). Chitin is a primary constituent of the supporting tissues and exoskeletons of arthropods and insects and the cell walls of many fungi. Living organisms, particularly sea crustacea such as crabs, shrimps, lobsters, produce millions of tons of chitin every year. Chitosan is derived from chitin by hydrolysis of some 2-deoxy-2-acetamidoglucose units to 2-deoxy-aminoglucose units. The term "chitosan" generally refers to copolymers having greater than 65% 2-deoxy-2-aminoglucose monomeric units, with the remainder monomeric units being 2-deoxy-2-acetamidoglucose units. The chitosan preferably is dissolved in an aqueous acidic solution such as acetic acid. A preferred aqueous acidic solution comprises about 1% acetic acid based on the combined weight of the acetic acid and the water. One exemplary chitosan is chitosan acetate solution. This is available from Cascade EcoSolutions, Inc. under the "Chitovan" trademark.

The benign, natural product coagulant as above described, and mixtures thereof, may be used conjointly with cationic flocculants and/or anionic flocculants. Exemplary cationic flocculants include the cationic acrylamide/quaternary ammonium salt copolymers. More specifically, these can be represented by the following Formula I:

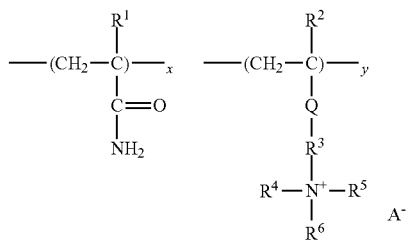

In Formula I, the molar ratio of repeat units x:y may vary from 95:5 to 5:95 with the molar ratio (x):(y) of 60:40 being presently preferred. $R^1$ and $R^2$ may be the same or different and are chosen from H and $CH_3$. Q is —C(O)O—, —OC(O)—, or —C(O)NH—, $R^3$ is branched or linear ($C_1$-$C_4$) alkylene; $R^4$, $R^5$, and $R^6$ are independently chosen from H, $C_1$-$C_4$ linear branched alkyl, or an $C_5$-$C_8$ aromatic or alkylaromatic group; A is an anion selected from $Cl^-$, $Br^-$, $HSO_4^-$, or $MeOSO_3^-$.

Exemplary repeat units (y) are as follows:
1. (AETAC)-2-acryloxyethyltrimethyl ammonium chloride; also referred to as dimethylaminoethylacrylate methyl chloride; in terms of Formula I above $R^1$=H; $R^2$=H; Q is —C(O)O—, $R^3$=Et; $R^4$, $R^5$, and $R^6$ are all Me, and A is $Cl^-$.
2. (MATAC)-3-(meth) acrylamidopropyltrimethyl ammonium chloride; in terms of Formula I above $R^1$=H; $R^2$=$CH_3$; Q is —C(O)NH—; $R^3$=Pr; $R^4$, $R^5$, and $R^6$ are all Me, and A is $Cl^-$.
3. (METAC)-2-methacryloxyethyltrimethyl ammonium chloride; in terms of Formula I above $R^1$=H; $R^2$=$CH_3$; Q is —C(O)O—; $R^3$ is Et and $R^4$, $R^5$, and $R^6$ are all Me, and A is $Cl^-$.

One exemplary cationic flocculant (I) copolymer is a 60:40 mole percent acrylamide/AETAC copolymer. The copolymer may be cross-linked as explained hereinafter. The degree of cross-linking is relatively minor and can amount from about $1\times10^{-4}$% to about $5\times10^{-3}$% based on 100 molar percent of the repeat units (x) and (y) present. Also, non-cross-linked copolymers (I) may be used. Other acrylamide/AETAC copolymers that may be mentioned include those in which AETAC is present in a molar amount of about 10-50 wt %.

The molecular weight of the copolymer may vary over a wide range, for example, 10,000-20,000,000. Usually, the copolymers will have molecular weights in excess of 1,000,000. The cationic flocculant copolymer should be water soluble or dispersible. It is present practice to employ the cationic flocculant copolymer (I) in the form of a water in oil emulsion. The oil phase may comprise hydrotreated isoparaffins and napthenics with a low level of aromatics.

Additional cationic flocculants that may be mentioned include polyEPI/DMA (a copolymer of epichlorohydrin and dimethylamine), and acrylamide/allyl trialkyl ammonium copolymer or an acrylamide diallyldialkyl ammonium copolymer. The molecular weights of these cationic flocculants may for example range from about 10,000 to 20,000,000.

The anionic flocculants that may be noted as exemplary are primarily acrylamide copolymers such as acrylamide/acrylic acid copolymers, acrylamide alkylacrylate copolymer, acrylamide/maleic acid, acrylamide maleic anhydride copolymers, and acrylamide/2-acrylamido-2-methyl propane sulfonic acid (AMPS). Additionally, acrylic acid homopolymers and salt forms, especially Na salts may be mentioned along with acrylic acid based copolymers such as acrylic acid/AMPS copolymers. Of specific note are the acrylic acid (AA)/acrylamide copolymers wherein the AA is present in an amount of about 20-50 molar %.

In one embodiment of the invention, the benign, natural coagulant selected from tannins and chitosans and cationic or anionic flocculant treatment approach may be used in conjunction with known mechanical separation techniques including flotation, filtration, reverse osmosis, cyclonic, and gravity separation techniques. For example, the coagulant/flocculant treatment may be used in conjunction with entrapped air flotation unit (EAF), induced gas flotation unit (IGF) or a dissolved air flotation (DAF) techniques wherein a sludge cake is formed and removed leaving clarified effluent for discharge with a portion of the effluent recycled to the EAF, IGF, or DAF unit.

The coagulant/flocculant treatment may also be used with conventional API and hydrocyclone separators and centrifugal separators such as the Voraxial® separation units with the latter being described in U.S. Pat. Nos. 5,084,189 and 6,248,231. In the above noted centrifugal separators, separation is effected via centrifugal acceleration of the liquid medium by a force vortex spinning action in a tube. The liquid medium is subjected to a swirling or vortex motion as it passes from an upstream to downstream direction in the tube whereby the heavier components are spun along the outer radii of the spinning medium for removal through a trap or port located along a peripheral section of the tube. The lighter fluid (mostly oil) is forced by free vortex action and by Bernoulli pressure forces into a tight cylindrical flow along the central axis of the spinning medium for removal through a conduit located along the tube axis. The heavy weight component moves to the outer circumference of the tube for disposal while the mid weight component or phase, mostly water, flows between the light and heavy fractions for collection.

EXAMPLES

In order to demonstrate the efficacy of the tannin based polymers for reducing turbidity, Chemical Oxygen Demand (COD), Oil & Grease (O&G), Total Organic Carbon (TOC) and molybdate reactive silica, water clarification tests were conducted on Location A SAGD Produce Water and Location B SAGD Produce Water. These serve as examples, but are not intended to limit the applicability to other similar waters.

Test Procedure

The procedure used was a standard jar test designed to simulate the operation of a typical produce water treatment clarifier, Dissolved Air Flotation Unit (DAF), Entrapped Air Flotation Unit (EAF), Induced Gas Flotation Unit (IGF) or Density Oil Separator device like the Voraxial oil separator.

For triple component treatments the test procedure consisted of:

1. Adjusting the pH between 2 to 8;
2. Adding a tannin based polymeric coagulant (e.g., C#1) to the test substrate;
3. Adjusting the pH between 6.5 to 10;
4. Adding a cationic flocculant (e.g., CF#1); and
5. Adding an anionic flocculant (e.g., AF#1).

The substrate was subjected to mixing throughout the chemical addition. Solids were allowed to settle or float after mixing and the supernatant was analyzed for residual turbidity, COD, Oil & Grease, TOC and molybdate reactive silica. This is an example of the triple component treatment system and does not limit the invention to this procedure.

For two component treatments the same procedure outlined above was followed. The first was the tannin based coagulant (e.g., C#1) and the other was either a cationic flocculant (e.g., CF# 1) or an anionic flocculant (e.g., AF#1).

Acids, such as sulfuric acid or hydrochloric acid, and bases, such as sodium hydroxide may be used to adjust the pH of the produce water.

The coagulant composition is added in any amount effective for agglomerating suspended or soluble oil and grease, organic acids, asphaltenes and suspended solids in produce water. The actual dosage depends upon the characteristics of the produce water to be treated. The tannin based polymeric coagulant (e.g., C#1) composition is added to the produce water in an amount from 0.5 part per million by volume to about 1000 parts per million by volume. The flocculants may be added in any amount suitable for improving the removal of soluble or suspended oil and grease, organic acids, asphaltenes and suspended solids in produce water. The amount of cationic flocculant (e.g., CF#1) added is from 0 parts per million by volume to 100 parts per million by volume. The amount of anionic flocculant (e.g., AF#1) added is from 0 parts per million by volume to 100 parts per million by volume.

Example 1

Several beakers with 200 ml of Location B SAGD produce water were obtained. The beakers were continuously stirred with paddle mixers. The initial pH of the produce water in the beakers was measured as 8. It was adjusted to a pH of 4 with sulfuric acid. Varying amounts of tannin based polymeric coagulant C#1 were added in the dosage range from 0 to 200 parts per million by volume. The coagulant was mixed for 60 seconds in all beakers. The pH of the produce water in the beakers was then adjusted to 8.5 with sodium hydroxide. After an additional 30 seconds of mixing, the cationic flocculant CF#1 was added to all the beakers at a dosage of 10 parts per million by volume. The cationic flocculant was mixed for an additional 15 seconds and then the anionic flocculant AF#1 was added at a dosage of 5 parts per million by volume. The stirring for the produce water was stopped after 2 minutes of total mixing time and the water was allowed to settle. For untreated produce water the turbidity was 452 NTU, the COD was 1530 mg/L, the molybdate reactive silica was 94.8 mg/L. Table 1 contains the lab efficacy test results for Example 1.

TABLE 1

Results for C#1, CF#2, and AF#1 polymer treatment of Location B SAGD produce water

| ID | C#1 parts per million by volume | CF#1 parts per million by volume | AF#1 parts per million by volume | Turbidity (NTU) | Reactive Silica (mg/L) | COD (mg/L) | Total Polymer parts per million by volume |
|---|---|---|---|---|---|---|---|
| 3 | 0 | 10 | 5 | 11.9 | 89 | 1558 | 15 |
| 4 | 20 | 10 | 5 | 6.73 | 89.2 | 1682 | 35 |
| 5 | 50 | 10 | 5 | 6.17 | 88.6 | 1526 | 65 |
| 6 | 80 | 10 | 5 | 5.16 | | | 95 |
| 7 | 100 | 10 | 5 | 5.41 | 90.4 | | 115 |
| 8 | 200 | 10 | 5 | 4.8 | | | 215 |

Example 2

Several beakers with 200 ml of Location B SAGD produce water were obtained. The beakers were continuously stirred with paddle mixers. The initial pH of the produce water in the beakers was measured as 8. It was adjusted to a pH of 4 with sulfuric acid. Varying amounts of tannin based polymeric coagulant C#2 were added in the dosage range from 0 to 200 parts per million by volume. The coagulant was mixed for 60 seconds in all beakers. The pH of the produce water in the beakers was then adjusted to 8.5 with sodium hydroxide. After an additional 30 seconds of mixing, the cationic flocculant CF#1 was added to all the beakers at a dosage of 10 parts per million by volume. The cationic flocculant was mixed for an additional 15 seconds and then the anionic flocculant AF#1 was added at a dosage of 5 parts per million by volume. The stirring for the produce water was stopped after 2 minutes of total mixing time and the water was allowed to settle. For untreated produce water the turbidity was 452 NTU, the COD was 1530 mg/L, the molybdate reactive silica was 94.8 mg/L. Table 2 contains the lab efficacy test results for Example 2.

TABLE 2

Results for C#2, CF#1 and AF#1 polymer treatment of Location B SAGD produce water

| ID | C#2 parts per million by volume | CF#1 parts per million by volume | AF#1 parts per million by volume | Turbidity (NTU) | Reactive Silica (mg/L) | COD (mg/L) | Total Polymer parts per million by volume |
|---|---|---|---|---|---|---|---|
| 9 | 0 | 10 | 5 | 13.9 | 88 | 1750 | 15 |
| 10 | 20 | 10 | 5 | 11.2 | 90.6 | 1556 | 35 |
| 11 | 50 | 10 | 5 | 7.84 | 85.8 | 1862 | 65 |
| 12 | 80 | 10 | 5 | 14.5 | | | 95 |
| 13 | 100 | 10 | 5 | 13.9 | | | 115 |
| 14 | 200 | 10 | 5 | 24.2 | | | 215 |

Example 3

Several beakers with 200 ml of Location B SAGD produce water were obtained. The beakers were continuously stirred with paddle mixers. The initial pH of the produce water in the beakers was measured as 8. It was adjusted to a pH of 4 with sulfuric acid. Varying amounts of tannin based polymeric coagulant C#3 were added in the dosage range from 0 to 100 parts per million by volume. The coagulant was mixed for 60 seconds in all beakers. The pH of the produce water in the beakers was then adjusted to 8.5 with sodium hydroxide. After an additional 30 seconds of mixing, the cationic flocculant CF#1 was added to all the beakers at a dosage of 10 parts per million by volume. The cationic flocculant was mixed for an additional 15 seconds and then the anionic flocculant AF#1 was added at a dosage of 5 parts per million by volume. The stirring for the produce water was stopped after 2 minutes of total mixing time and the water was allowed to settle. For untreated produce water the turbidity was 351 NTU, the COD was 1772 mg/L, the molybdate reactive silica was 111.6 mg/L. Table 3 contains the efficacy test results for Example 3.

TABLE 3

Results for C#3, CF#1 and AF#1 polymer treatment of Location B SAGD produce water

| ID | C#3 parts per million by volume | CF#1 parts per million by volume | AF#1 parts per million by volume | Turbidity (NTU) | Reactive Silica (mg/L) | COD (mg/L) | Total Polymer parts per million by volume |
|---|---|---|---|---|---|---|---|
| 16 | 0 | 10 | 5 | 10.5 | 86.4 | 1640 | 15 |
| 17 | 5 | 10 | 5 | 6.4 | 89.2 | 1526 | 20 |
| 18 | 20 | 10 | 5 | 7.01 | 88.2 | 1818 | 35 |
| 19 | 50 | 10 | 5 | 67.9 | | | 65 |
| 20 | 80 | 10 | 5 | 292 | | | 95 |
| 21 | 100 | 10 | 5 | 291 | | | 115 |

Example 4

Several beakers with 200 ml of Location A SAGD produce water were obtained. The beakers were continuously stirred with paddle mixers. The initial pH of the produce water in the beakers was measured as 6.5. It was adjusted to a pH of 3.5 with sulfuric acid. Varying amounts of tannin based polymeric coagulant C#1 were added in the dosage range from 0 to 200 parts per million by volume. The pH of the produce water in the beakers was kept at 3.5. The coagulant was mixed for 90 seconds in all beakers. The cationic flocculant CF#1 was added to all the beakers at a dosage of 15 parts per million by volume. The cationic flocculant was mixed for an additional 15 seconds and then the anionic flocculant AF#1 was added at a dosage of 10 parts per million by volume. The stirring for the produce water was stopped after 2 minutes of total mixing time and the water was allowed to settle. For untreated produce water the turbidity was 83.1 NTU, the COD was 844 mg/L, the molybdate reactive silica was 220 mg/L. Table 4 contains the efficacy test results for Example 4.

TABLE 4

Results for C#1, CF#1, and AF#1 polymer treatment of Location A SAGD produce water

| ID | C#1 parts per million by volume | CF#1 parts per million by volume | AF#1 parts per million by volume | Turbidity (NTU) | Reactive Silica (mg/L) | COD (mg/L) | Total Polymer parts per million by volume |
|---|---|---|---|---|---|---|---|
| 31 | 0 | 15 | 10 | 4.45 | 68 | 464 | 25 |
| 32 | 20 | 15 | 10 | 4.74 | 70 | 464 | 45 |
| 33 | 50 | 15 | 10 | 5.24 | 68 | 472 | 75 |
| 34 | 80 | 15 | 10 | 7.39 | | | 105 |
| 35 | 100 | 15 | 10 | 7.35 | | | 125 |
| 36 | 200 | 15 | 10 | 9.24 | | | 225 |

Example 5

Several beakers with 200 ml of Location A SAGD produce water were obtained. The beakers were continuously stirred with paddle mixers. The initial pH of the produce water in the beakers was measured as 6.5. It was adjusted to a pH of 3.5 with sulfuric acid. Varying amounts of tannin based polymeric coagulant C#3 were added in the dosage range from 0 to 100 parts per million by volume. The pH of the produce water in the beakers was kept at 3.5. The coagulant was mixed for 90 seconds in all beakers. The cationic flocculant CF#1 was added to all the beakers at a dosage of 15 parts per million by volume. The cationic flocculant was mixed for an additional 15 seconds and then the anionic flocculant AF#1 was added at a dosage of 10 parts per million by volume. The stirring for the produce water was stopped after 2 minutes of total mixing time and the water was allowed to settle. For untreated produce water the turbidity was 83.6 NTU, the COD was 844 mg/L, the molybdate reactive silica was 209 mg/L. Table 5 contains the efficacy test results for Example 5.

TABLE 5

Results for C#3, CF#1 and AF#1 polymer treatment of Location A SAGD produce water

| ID | C#3 parts per million by volume | CF#1 parts per million by volume | AF#1 parts per million by volume | Turbidity (NTU) | Reactive Silica (mg/L) | COD (mg/L) | Total Polymer parts per million by volume |
|---|---|---|---|---|---|---|---|
| 44 | 0 | 15 | 10 | 4.38 | 61 | 425 | 25 |
| 45 | 5 | 15 | 10 | 4.6 | 68 | 400 | 30 |
| 46 | 20 | 15 | 10 | 5.39 | 64 | 406 | 45 |
| 47 | 50 | 15 | 10 | 6.62 | | | 75 |
| 48 | 80 | 15 | 10 | 8.98 | | | 105 |
| 49 | 100 | 15 | 10 | 6.88 | | | 125 |

Example 6

Several beakers with 200 ml of Location A SAGD produce water were obtained. The beakers were continuously stirred with paddle mixers. The initial pH of the produce water in the beakers was measured as 6.5. It was adjusted to a pH of 3.5 with sulfuric acid. Varying amounts of tannin based polymeric coagulant C#2 were added in the dosage range from 0 to 200 parts per million by volume. The pH of the produce water in the beakers was kept at 3.5. The coagulant was mixed for 90 seconds in all beakers. The cationic flocculant CF#1 was added to all the beakers at a dosage of 15 parts per million by volume. The cationic flocculant was mixed for an additional 15 seconds and then the anionic flocculant AF#1 was added at a dosage of 10 parts per million by volume. The stirring for the produce water was stopped after 2 minutes of total mixing time and the water was allowed to settle. For untreated produce water the turbidity was 83.6 NTU, the COD was 844 mg/L, the molybdate reactive silica was 209 mg/L. Table 6 contains the efficacy test results for Example 6.

TABLE 6

Results for C#2, CF#1 and AF#1 polymer treatment of Location A SAGD produce water

| ID | C#2 parts per million by volume | CF#1 parts per million by volume | AF#1 parts per million by volume | Turbidity (NTU) | Reactive Silica (mg/L) | COD (mg/L) | Total Polymer parts per million by volume |
|---|---|---|---|---|---|---|---|
| 50 | 0 | 15 | 10 | 4.85 | 56 | 394 | 25 |
| 51 | 20 | 15 | 10 | 4.46 | 57 | 403 | 45 |
| 52 | 50 | 15 | 10 | 4.9 | 57 | 409 | 75 |
| 53 | 80 | 15 | 10 | 6.13 | | | 105 |
| 54 | 100 | 15 | 10 | 6.43 | | | 125 |
| 55 | 200 | 15 | 10 | 12.3 | | | 225 |

Example 7

Beakers with 200 ml of Location A SAGD produce water were obtained. The beakers were continuously stirred with paddle mixers. The initial pH of the produce water in the beakers was measured as 7.5. It was adjusted to a pH of 4 with sulfuric acid. C#1 was added at a dosage of 20 parts per million by volume. The coagulant was mixed for 105 seconds in the beakers. The cationic flocculant CF#1 was added at a dosage of 15 parts per million by volume. The cationic flocculant was mixed for an additional 15 seconds. The anionic flocculant AF#1 was then added at a dosage of 10 parts per million by volume. The stirring for the produce water was stopped after 2 minutes of total mixing time and the water was allowed to settle. The clarified water from several beakers was pooled together for analysis. Table 7 contains the lab efficacy test results for Example 7 with both the untreated and polymer treated waters.

TABLE 7

Laboratory results for C#1, CF#1, AF#1 polymer treatment of Location A SAGD produce water

| ID | C#1 parts per million by volume | CF#1 parts per million by volume | AF#1 parts per million by volume | Turbidity (NTU) | Reactive Silica (mg/L) | COD (mg/L) | Total Polymer parts per million by volume | O&G (mg/L) | TOC (mg/L) | % Removal Silica | % Removal COD | % Removal O&G | % Removal TOC |
|---|---|---|---|---|---|---|---|---|---|---|---|---|---|
| 2 | 20 | 15 | 10 | 8.97 | 60 | 450 | 45 | 9.4 | 120 | 75% | 54% | 98% | 42% |
| 6 | 0 | 0 | 0 | 85.6 | 240 | 970 | 0 | 624 | 207 | | | | |

Example 8

Beakers with 200 ml of Location B SAGD produce water were obtained. The beakers were continuously stirred with paddle mixers. The initial pH of the produce water in the beakers was measured as 8. It was adjusted to a pH of 5.5 with sulfuric acid. Coagulant C#1 was added at a dosage of 20 parts per million by volume. The coagulant was mixed for 60 seconds in the beakers. The pH of the beakers was then adjusted to pH 8.5 with sodium hydroxide. The coagulant C#1 was mixed for an additional 30 seconds. The cationic flocculant CF#1 was then added at a dosage of 10 parts per million by volume. The cationic flocculant was mixed for an additional 15 seconds. The anionic flocculant AF#1 was then added at a dosage of 5 parts per million by volume. The stirring for the produce water was stopped after 2 minutes of total mixing time and the water was allowed to settle. The clarified water from several beakers was pooled together for analysis. Table 8 contains the efficacy test results for Example 8 with both the untreated and polymer treated waters.

TABLE 8

Results for C#1, CF#1, AF#1 polymer treatment of Location B SAGD produce water

| ID | C#1 parts per million by volume | CF#1 parts per million by volume | AF#1 parts per million by volume | Turbidity (NTU) | Reactive Silica (mg/L) | O&G (mg/L) | Total Polymer parts per million by volume | % Removal Silica | % Removal O&G |
|---|---|---|---|---|---|---|---|---|---|
| 2 | 20 | 10 | 5 | 8.45 | 96 | 10.4 | 35.0 | 14.3% | 58.4% |
| 5 | 0 | 0 | 0 | 284 | 112 | 25 | | | |

C#1 = Mannich reaction product of wattle tannin/monoethanolamine (MEA)/formaldehyde available GE, "Klaraid PC2700".
C#2 = tannin/MADAME copolymer- available GE "Coag 250".
C#3 = tannin (AETAC copolymer; AETAC present ≈57 wt %, available GE "Klaraid PC2705").
CF#1 = acrylamide/AETAC cationic copolymer, available GE "Polyfloc CE1629".
AF#1 = acrylic acid/acrylamide anionic copolymer, acrylic acid present 26% mole %, available GE "Polyfloc AE1125".

Based upon presently available data, a preferred treatment comprises a combination of C# 1, CF# 1 and AF# 1.

Typical embodiments have been set forth for purposes of illustration of the invention. The foregoing descriptions should not be deemed to be a limitation on the scope herein. It is apparent that numerous other forms and modifications of the invention will occur to one skilled in the art without departing from the spirit and scope herein. The appended claims and these embodiments should be construed to cover all such obvious forms and modifications that are within the true spirit and scope of the present invention.

What is claimed is:

1. A method for treating produce water from a steam assisted gravity drainage (SAGD) operation, said method comprising the steps of:
    a) adjusting said produce water to a pH of about 2 to 8;
    b) after said step a), adding a tannin coagulant to said produce water;
    c) after said step b), adjusting pH of said produce water to between about 6.5 to 10; and
    d) adding to said produce water from step c) a cationic flocculant and an anionic flocculant, said cationic flocculant comprising a member selected from the group consisting of an acrylamide/quaternary ammonium salt copolymer, a copolymer of epichlorohydrin and amine, an acrylamide allyl trialkyl ammonium copolymer, and acrylamide/diallyl dialkyl ammonium copolymer, said anionic flocculant comprising a member selected from the group consisting of acrylamide/acrylic acid copolymers and salts thereof, acrylamide alkylacrylate copolymers, acrylamide/maleic acid copolymers, acrylamide maleic anhydride copolymers, acrylamide/(AMPS) copolymers, acrylic acid homopolymers and salts thereof, and acrylic acid (AMPS) copolymers.

2. A method as recited in claim 1 wherein said tannin coagulant is added in an amount of about 0.5-1,000 ppm based upon one million parts of said produce water and each of said cationic flocculant and anionic flocculant is added in an amount of about 0.5-100 ppm.

3. A method as recited in claim 1 further comprising separating said produce water in a hydrocyclonic separator, dissolved air flotation unit, entrapped air flotation unit, induced gas flotation unit, gravity filter, reverse osmosis filter, API separator, or centrifugal separators after said step d).

4. A method as recited in claim 1 wherein said tannin coagulant is a tannin/cationic copolymer.

5. A method as recited in claim 4 wherein said tannin/cationic copolymer has a cationic repeat unit moiety comprising MADAME, METAC, or AETAC.

6. A method as recited in claim 5 wherein said cationic repeat unit moiety is MADAME.

7. A method as recited in claim 5 wherein said cationic repeat unit moiety is METAC.

8. A method as recited in claim 5 wherein said cationic repeat unit moiety is AETAC.

9. A method as recited in claim 1 wherein said tannin coagulant is a reaction product of tannin, an aldehyde, and an amine.

10. A method as recited in claim 9 wherein said tannin coagulant comprises a reaction product of tannin, aldehyde, and a primary amine.

11. A method as recited in claim 10 wherein said tannin coagulant comprises a reaction product of tannin/monoethanolamine and formaldehyde.

12. A method as recited in claim 1 comprising further adding a chitosan to said produce water.

13. A method as recited in claim 1 wherein COD, turbidity, and oil and grease concentrations are reduced in said produce water.

* * * * *